Patented July 1, 1924.

1,500,066

UNITED STATES PATENT OFFICE.

HANS FINKELSTEIN, OF UERDINGEN-ON-THE-RHINE, GERMANY.

ART OF IMPREGNATING WOOD.

No Drawing.   Application filed March 25, 1922.   Serial No. 546,874.

*To all whom it may concern:*

Be it known that I, HANS FINKELSTEIN, a citizen of Germany, and a resident of Uerdingen-on-the-Rhine, Germany, have invented certain new and useful Improvements in the Art of Impregnating Wood, of which the following is a specification.

This invention relates to improvements in the art of impregnating wood and a new composition of matter to perform it.

Mixtures of inorganic salts with organic nitro compounds, especially the dinitrophenols and dinitrophenol salts, are in current use for wood preserving purposes. Such mixtures have, as is well known, very strong fungicide properties, though they are harmless for men and animals, but their aqueous solutions have the disadvantage that they corrode the shells of the boilers used for impregnating under pressure. The means proposed up to now to remedy this fault are not always efficacious.

According to this invention the injurious effect of said solutions on iron is completely avoided by adding to them small quantities of compounds of the bivalent metals of the ammonium sulfid group (i. e. the metals the solutions of which are precipitated by ammonium sulfid in qualitative analysis), for instance compounds of zinc, manganese, and nickel. As those compounds have no protecting effect on iron under ordinary rusting conditions, their efficiency in preventing corrosion by dinitrophenol mixtures is a very surprising fact.

The best results are obtained with insoluble basic compounds of the metals cited above, but also soluble basic and even neutral salts are useful, so far as the metals in question are not precipitated in metallic state out of their solutions by iron. In most cases the effect of the neutral salts is quite sufficient.

My invention may be illustrated by the following examples:

(1). Wood is impregnated under pressure with a solution of 1.2 kilograms of dinitrophenol and 7 kilograms of sodium fluorid in 1 cubic meter of water, to which 1 kilogram of finely divided zinc oxid is added. Whilst by a solution of the above composition with omission of zinc oxid, iron is strongly corroded with formation of dark-coloured rust-like deposits, in presence of zinc oxid the iron surfaces remain even and the solution clear with its original pure yellow color. The loss of weight of a boiler plate sample immersed in the fluid is ten times greater in absence than in presence of the zinc oxid.

(2). An impregnating liquor is made by dissolving 1.4 kilograms of sodium dinitrophenate and 17 kilograms of crystallized Glauber's salt in one cubic meter of water and adding 3 kilograms of zinc carbonate. The effect is nearly the same as in the foregoing example.

(3). 1 kilogram of zinc oxid is added to 1 cubic meter of water, in which 1.3 kilograms of dinitro-o-cresol and 10 kilograms of crystallized magnesium chlorid are dissolved. The corrosive influence of this impregnating solution on iron, though very strong in absence of zinc oxid, is quite insignificant.

(4). Wood is impregnated in the same manner as described in the first example, but instead of the zinc oxid 2 kilograms of nickel carbonate are used. The corrosion of the iron parts of the apparatus is but the fifth part of that caused by pure water under like conditions.

(5). The impregnating liquor is composed by 9 kilograms of basilite (a mixture of anilin dinitrophenate and sodium fluorid) dissolved in 1 cubic meter of water and additioned by 1 kilogram of zinc oxid. No corrosion at all is to be noticed, and the weight of an iron sample immersed in the liquid remains constant.

(6). Instead of 1 kilogram of zinc oxid 5 kilograms of crystallized zinc sulfate are employed, the other conditions being the same as in the foregoing example. The effect is the same.

I claim:

1. In processes of impregnating wood comprising treating wood with solutions of aromatic nitro compounds and water soluble salts of strong inorganic bases in an iron vessel, the step of reducing the corrosive action of the impregnating solutions upon the iron vessel which consists in adding a compound of a bivalent metal of the ammonium sulfid group to the impregnating solutions.

2. In processes of impregnating wood comprising treating wood with solutions of aromatic nitro compounds and water soluble salts of strong inorganic bases in an iron vessel, the step of reducing the corrosive action of the impregnating solutions upon the iron vessel which consists in adding a basic insoluble compound of a bivalent metal of the ammonium sulfid group to the impregnating solutions.

3. In processes of impregnating wood comprising treating wood with solutions of aromatic nitro compounds and water soluble salts of strong inorganic bases in an iron vessel, the step of reducing the corrosive action of the impregnating solutions upon the iron vessel which consists in adding a compound of zinc to the impregnating solutions.

4. In processes of impregnating wood comprising treating wood with solutions of aromatic nitro compounds and water soluble salts of strong inorganic bases in an iron vessel, the step of reducing the corrosive action of the impregnating solutions upon the iron vessel which consists in adding zinc oxid to the impregnating solutions.

5. A composition for the preservation of wood comprising an organic nitro compound, a water soluble salt of a strong inorganic base, and a compound of a bivalent metal of the ammonium sulfid group.

6. A composition for the preservation of wood comprising an organic nitro compound, a water soluble salt of a strong inorganic base, and a basic compound of a bivalent metal of the ammonium sulfid group.

7. A composition for the preservation of wood comprising an organic nitro compound, a water soluble salt of a strong inorganic base, and a compound of zinc.

8. A composition for the preservation of wood comprising an organic nitro compound, a water soluble salt of a strong inorganic base, and a basic insoluble compound of zinc.

9. A composition for the preservation of wood comprising an organic nitro compound, a water soluble salt of a strong inorganic base, and zinc oxid.

10. A composition for the preservation of wood comprising a compound of dinitrophenol and an aromatic amine, a water soluble salt of a strong inorganic base, and a compound of zinc.

11. A composition for the preservation of wood comprising a compound of dinitrophenol and an aromatic amine, a water soluble salt of a strong inorganic base, and a basic insoluble compound of zinc.

In witness whereof I have hereunto signed my name this ninth day of March, 1922.

HANS FINKELSTEIN.

Witnesses:
H. D. SOMMERHOFF,
G. FLESCH.